June 22, 1926.
A. C. MOYSES
1,589,543
VEHICLE CAB
Filed April 29, 1924   3 Sheets-Sheet 1
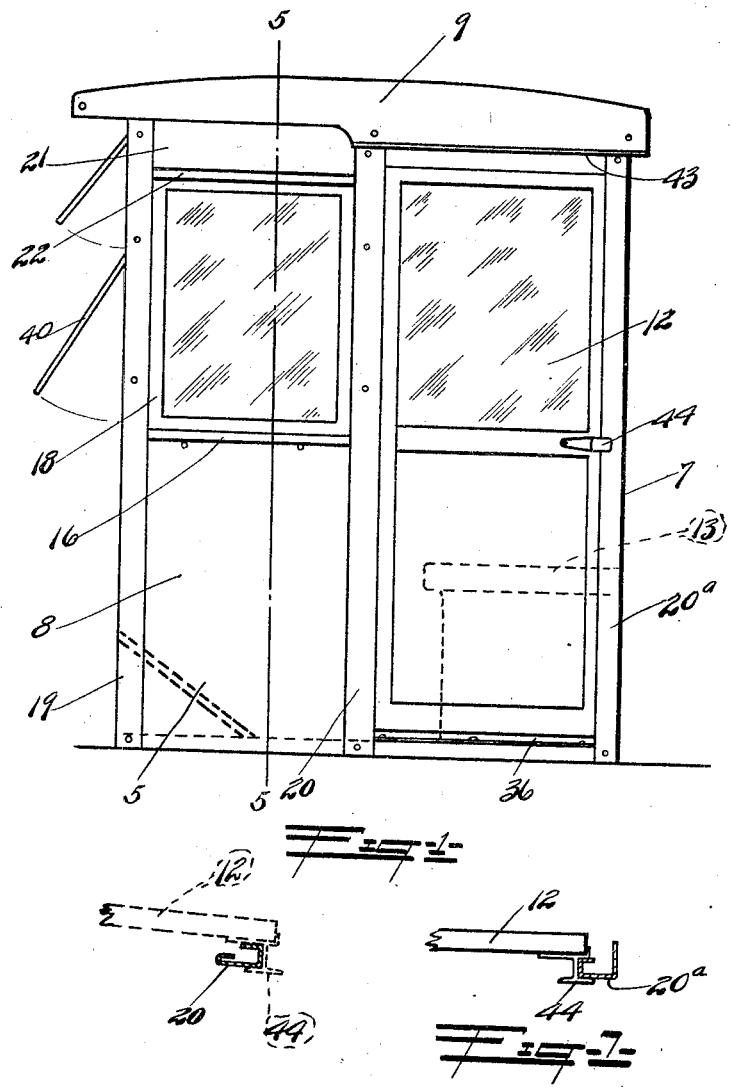
INVENTOR.
Arthur C. Moyses.
BY
Frank C. Farman
ATTORNEY.

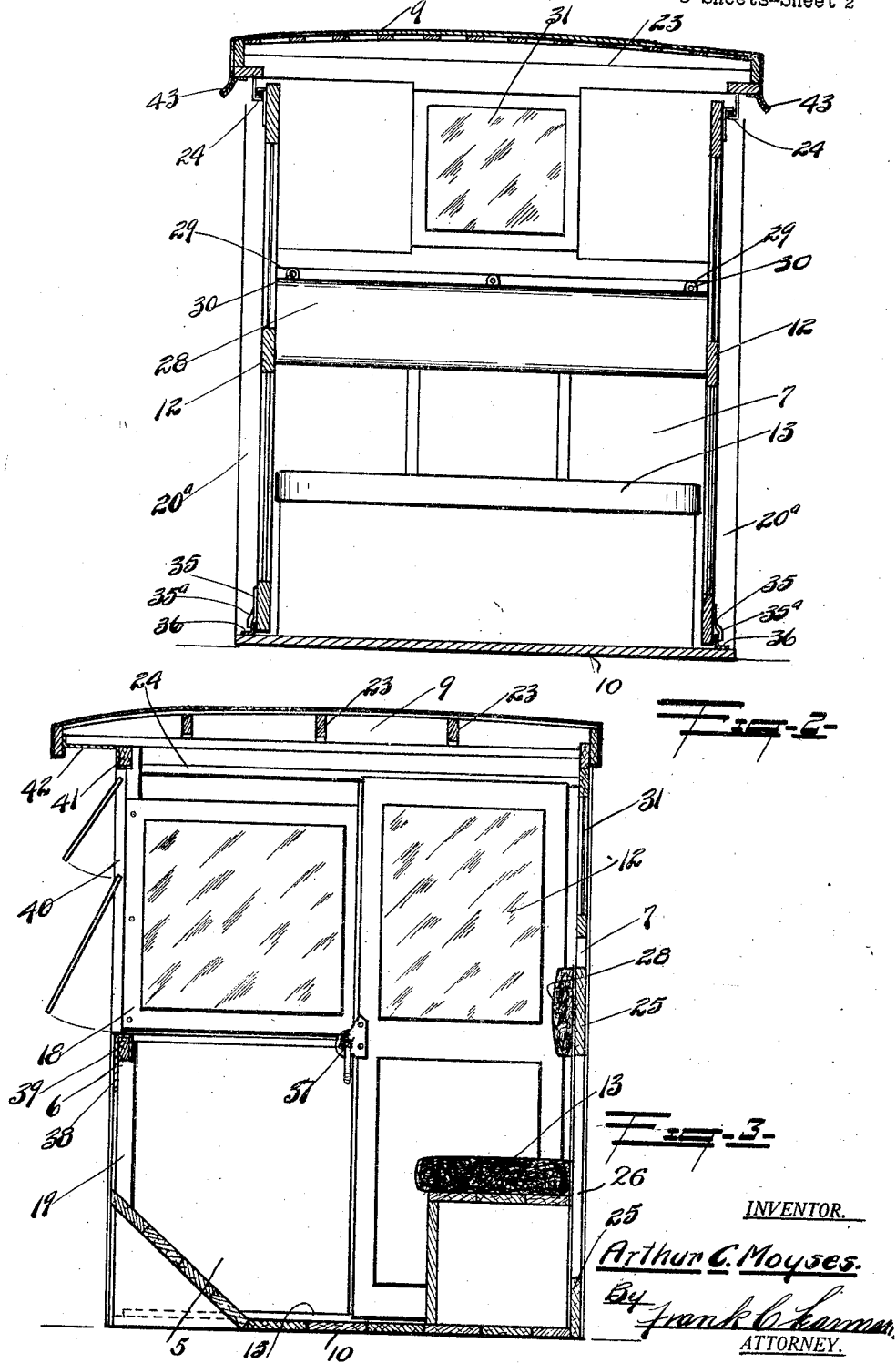

June 22, 1926.
A. C. MOYSES
1,589,543
VEHICLE CAB
Filed April 29, 1924     3 Sheets-Sheet 3
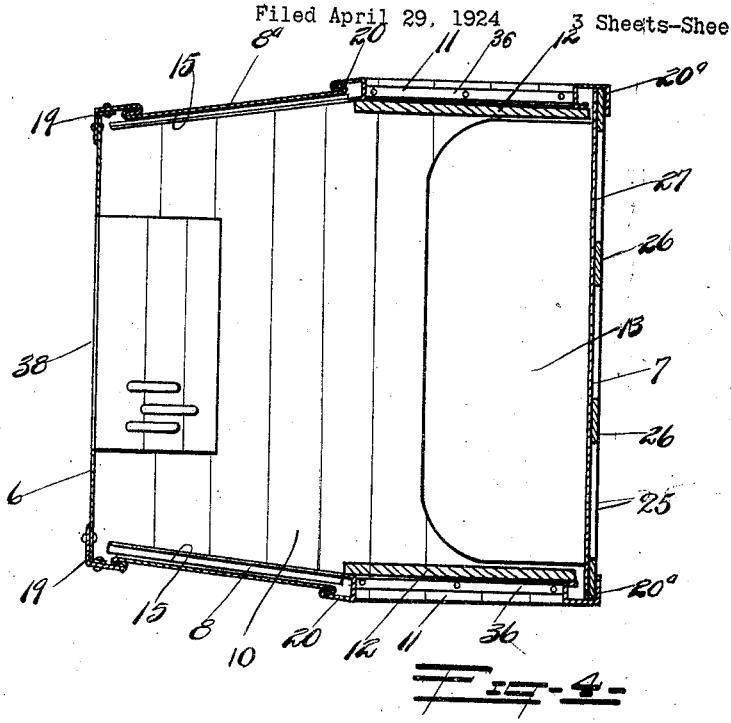
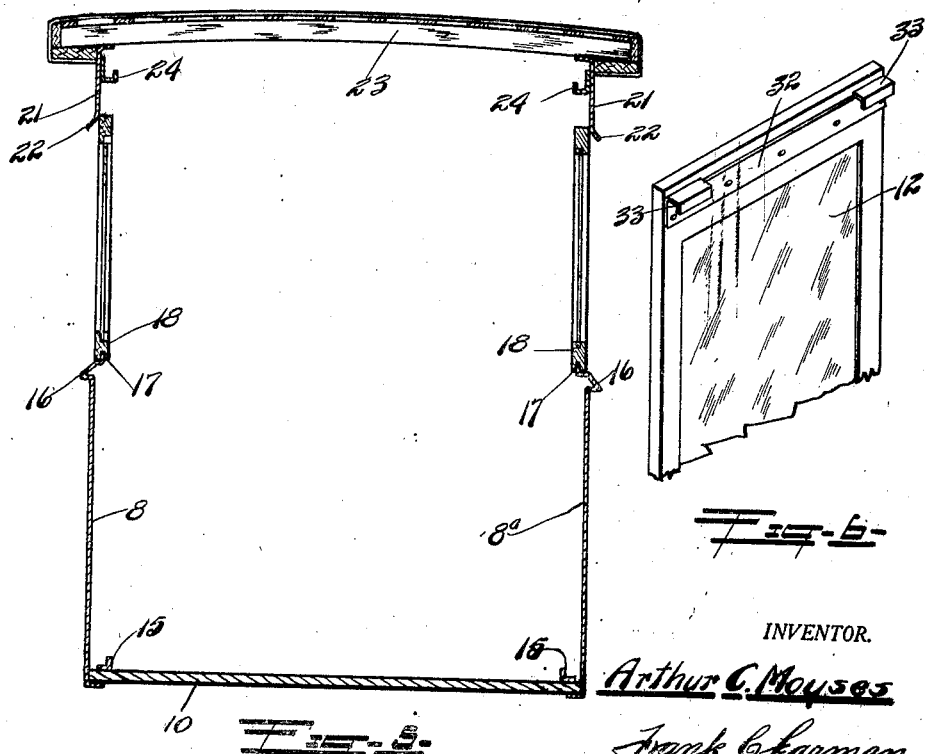
INVENTOR.
Arthur C. Moyses
Frank C. Harman.
ATTORNEY.

Patented June 22, 1926.

1,589,543

UNITED STATES PATENT OFFICE.

ARTHUR C. MOYSES, OF BAY CITY, MICHIGAN, ASSIGNOR TO KASMIR E. NIEDZIELSKI, OF BAY CITY, MICHIGAN.

VEHICLE CAB.

Application filed April 29, 1924. Serial No. 709,761.

This invention relates to vehicle cabs and particularly to a cab constructed of metal.

One object of the invention is to design a closed metal cab of durable and substantial construction, which can be very easily manufactured, and which lends itself to quantity production.

Another object is to provide a metal cab which can be manufactured at a very low cost, and which shall be of neat and pleasing appearance.

A further object is to provide a cab having sliding doors opening at the side of the body at the rear to allow ample space for the driver to alight from either side of the vehicle.

A still further object is to so form and connect the metal side panels that the connection at the windows will also form a weatherstrip as well as a support.

The above and other objects will appear as the specification progresses, reference being had to the accompanying drawings, in which like references indicate like parts throughout the several views thereof.

In the drawings,

Fig. 1 is a side view of my improved metal cab.

Fig. 2 is a transverse vertical sectional view thereof taken through the doors of the cab.

Fig. 3 is a longitudinal vertical sectional view.

Fig. 4 is a sectional top plan view thereof.

Fig. 5 is a transversal vertical sectional view taken on the line 5—5 of Fig. 1.

Fig. 6 is a fragmentary isometric view of one of the sliding doors.

Fig. 7 is a fragmentary sectional plan view illustrating the door stop, the full lines showing the door in closed position and the dotted lines illustrating it open.

Referring now particularly to the drawings in which is shown the preferred embodiment of my invention, the numeral 5 indicates the body which comprises the front and rear walls 6 and 7, and the two side walls 8 and 8ª, a roof 9 and a floor 10 are provided in the conventional manner.

Openings 11 are provided in each side wall in the position as shown, sliding doors 12 being provided as a closure therefor, the usual seat 13 is provided for the accommodation of the driver, the front corners thereof being rounded to facilitate getting into and out of the cab.

The side walls comprise a panel of sheet metal, the lower end of which is flanged and secured to the underside of the floor, a small angle section 15 being provided on the inside directly adjacent the said panel and is secured to the floor of the cab, the upper edge of the side panel 8 is bent out and up at an angle to form a sill 16, thence being bent horizontally and thence turned vertically, the end of the metal being received within a groove 17 provided in the window frame 18, one edge of the panel being turned and engages the vertically disposed metal corner member 19, forming a lock seam therewith, the opposite edge engaging the door jam 20 and forming a lock-seam in a substantially similar manner, this jamb being shaped as clearly shown in Fig. 4 of the drawing, and is similar to a channel having unequal legs, the side stile of the window being received in this channel, the opposite side of the window being bolted or otherwise secured to the member 19.

Another narrow panel 21 extends from the top of the window to the roof of the cab, the lower edge being flared outwardly to form a drip cap 22, the upper edge being broken over and secured to the roof ribs 23. A track 24 is secured to the inside of this panel 21 and extends the entire length of the cab, the doors 12 being slidably mounted therein.

The rear corner member 20ª is formed substantially similar to the member 20, spaced apart transversely disposed preferably wood members 25 being bolted thereto, and these transverse members are connected by the vertically disposed members 26. Metal panels 27 are secured on the inside as shown and a back rest 28 is also secured to the rear wall by means of a strap 29 having suitable openings for the reception of bolts or screws 30.

A window 31 is also provided in the rear wall in line with the driver's vision, and is slidably mounted so that it can be opened and closed for ventilation, etc., when desired.

I wish to direct particular attention to the shape of the cab, the front end of which is tapered, presenting a neat and pleasing appearance, naturally the tapering of the front of the cab reduces the floor area, makes it necessary to slide the door around this corner in the body, and were the doors located in the position as usual in the conventional cab, it would be very inconvenient for the driver to enter and leave, due to the position of the steering wheel and control levers, in fact it would be almost impossible to use the door nearest the steering wheel, but by locating the doors as shown ample space is provided, and the driver can freely enter and leave from either side of the cab.

The doors 12 are provided with a metal strip or panel 32 secured at the top thereof, both ends being formed as shown at 33, these engage the track 24 and support the door, a small fibre block (not shown) being secured thereto and prevents vibration, etc., guides 35 are secured to the bottom of the door in spaced relation and are formed with a leg $35^a$ adapted to engage one leg of the angle 15 secured to the cab floor, the rear guide engaging the upstanding leg of the angle 36.

A lock 37 is provided on each door and engages the jamb of the door holding it in locked position or it can also be held in open position if desired, this I shall not describe in detail, as it is the subject matter of a separate application to be filed thereon.

The front wall of the cab comprises a metal panel 38, the ends of which are flanged and riveted to the corner members 19, a transversely disposed brace 39 being provided as shown and over which the edge of the panel is bent to form a sill for the windshield 40.

A similar member 41 is provided at the top, the panel 42 being flanged thereover, thence being secured to the top, this windshield frame unit can be secured to the corner members in any approved manner, and is substantially similar to the windshields in general use.

The top is of the conventional construction, a drip 43 being formed over the door, and the top being shaped so as to present a pleasing appearance.

A stop 44 is secured to the door in the position as shown, and is adapted to engage the corner member $20^a$ when in closed position, and the opposite jamb member 20, when open, and as illustrated in dotted lines in Fig. 7, of the drawing.

From the foregoing description it will be obvious that I have perfected a very neat appearing vehicle cab, which can be very cheaply manufactured and assembled.

What I claim is:—

1. A vehicle cab having a tapered front end, metal corner members, side walls formed of a metal panel, the lower end of which is flanged and secured to the floor, the upper edge being broken over to form a sill, the end being received in a slot formed in the window, the edges of the panel being turned and forming a lock seam with the corner members.

2. A cab having a tapered front end, substantially angular front corner members, a door frame of substantially channel-shaped construction, metal side panels between the corner member and the frame, the lower ends being flanged and secured to the floor, the upper end being bent to form a sill, the edge being received in a slot in the window, the edges being turned and forming a lock-seam with the corner member and door frame respectively.

3. A vehicle cab having a tapered front end, substantially angular shaped front corner members, a door frame formed of channel-shaped vertically disposed members, metal side panels between the corner members and the door frame, the lower edge of which is flanged and secured to the floor, the upper edge being received within a slot in the window, the sides forming a lock seam with the corner and frame members respectively, doors forming a closure for said openings, and a stop on the door adapted to engage the door jambs in open and closed position respectively.

In testimony whereof I affix my signature.

ARTHUR C. MOYSES.